United States Patent
Kondabattini et al.

(10) Patent No.: US 9,144,013 B2
(45) Date of Patent: Sep. 22, 2015

(54) REDUCING POWER CONSUMPTION BY EFFECTIVELY UTILIZING THE DEVICE WAKE UP TIME IN SINGLE CHANNEL CONCURRENCY

(71) Applicant: QUALCOMM Incorporated, San Diego, CA (US)

(72) Inventors: Ganesh Kondabattini, Hyderabad (IN); Jindal Deepak Kumar, Hyderabad (IN); Sudheer Hyderabad, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 13/925,638

(22) Filed: Jun. 24, 2013

(65) Prior Publication Data

US 2014/0269473 A1 Sep. 18, 2014

Related U.S. Application Data

(60) Provisional application No. 61/781,350, filed on Mar. 14, 2013.

(51) Int. Cl.
*H04W 52/02* (2009.01)
*H04W 88/06* (2009.01)

(52) U.S. Cl.
CPC .......... *H04W 52/0209* (2013.01); *H04W 88/06* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2011/0235600 A1 | 9/2011 | Sun et al. | |
| 2012/0020266 A1 | 1/2012 | Sun et al. | |
| 2012/0106381 A1* | 5/2012 | Vedantham et al. | 370/252 |
| 2012/0275362 A1 | 11/2012 | Park et al. | |
| 2014/0119252 A1* | 5/2014 | Kella et al. | 370/311 |

OTHER PUBLICATIONS

Rison, M., "802.11-2012 resolutions for Power Management subfield", IEEE 802.11-12/1199r0, Sep. 2012, 39 pgs.
Wu, et al., "Energy-Efficient Wake-Up Scheduling for Data Collection and Aggregation", IEEE Transactions on Parallel and Distributed Systems, 21(2), 2010, pp. 275-287.

* cited by examiner

*Primary Examiner* — Frank Duong
(74) *Attorney, Agent, or Firm* — Holland & Hart LLP

(57) ABSTRACT

A wireless device implements power saving logic for two or more wireless clients that concurrently communicate on a shared wireless channel (single channel concurrency). When one of the wireless clients transitions from power save mode to active mode (e.g., in response to a beacon signal), the power saving logic causes the other wireless client(s) to transition to active mode as well. Each wireless client 'awakened' in this manner transmits a NULL frame having a power management bit set to a logic '0' value to an associated access point (AP), thereby indicating its active status to the associated AP. As a result, all of the wireless clients may concurrently receive buffered data from their associated APs on the shared wireless channel. If the 'awakened' wireless client(s) do not need to transition to active mode in response to their next received beacons, power consumption of the wireless device is advantageously reduced.

32 Claims, 3 Drawing Sheets

REDUCING POWER CONSUMPTION BY EFFECTIVELY UTILIZING THE DEVICE WAKE UP TIME IN SINGLE CHANNEL CONCURRENCY

RELATED APPLICATION

This application claims priority under 35 U.S.C. §119(e) to U.S. Provisional Application Ser. No. 61/781,350, entitled "Reducing Power Consumption By Effectively Utilizing The Device Wake Up Time In Single Channel Concurrency", filed on Mar. 14, 2013, which is herein incorporated by reference in its entirety.

FIELD OF THE INVENTION

The disclosure relates to methods and structures for reducing power consumption in a wireless device operating with single channel concurrency.

RELATED ART

Supporting multiple Wi-Fi sessions within a single wireless local access network (WLAN) device (e.g., a smartphone) is becoming popular. In order to support multiple Wi-Fi sessions on a single device, a Wi-Fi chip set must be capable of working in different modes, such as hotspot (Software Enabled Access Point (SoftAP)), Wi-Fi and Wi-Fi Direct. Implementing a plurality of Wi-Fi sessions using a plurality of these different modes at the same time is referred to as "concurrency." Concurrent Wi-Fi sessions may co-exist on the same wireless channel, or may co-exist on different wireless channels. "Single channel concurrency" exists when concurrent Wi-Fi sessions co-exist on the same channel. "Multi-channel concurrency" exists when concurrent Wi-Fi sessions co-exist on different channels.

A WLAN device operating with single channel concurrency may exhibit high power consumption. For example, assume two client sessions implemented by a WLAN device co-exist on the same channel (single channel concurrency). In the first client session (e.g., a Wi-Fi session), the WLAN device operates as a Wi-Fi station (STA) that is associated with an external wireless access point (AP). In the second client session (e.g., a Wi-Fi Direct session), the WLAN device operates as a P2P-client that is associated with an external P2P-GO (peer-to-peer group owner). In order to remain associated with both the wireless AP and the P2P-GO, the WLAN device must wake up to receive beacons periodically transmitted from both the wireless AP and the P2P-GO at target beacon transmission times (TBTTs). Because the two client sessions co-exist on the same channel, the TBTTs for the two sessions will be different. That is, the wireless AP will transmit beacons to the WLAN device at different times than the P2P-GO will transmit beacons to the WLAN device. The two client sessions must therefore wake up (transition from a power save mode to an active mode) at two different intervals to receive the beacons transmitted by both the wireless AP and the P2P-GO.

The WLAN device will save power if and only if both of the client sessions are simultaneously in a power save mode. If one of the client sessions is active and the other client session is in power save mode, then the WLAN device will be in an active mode for the shared channel. When a first one of the client sessions comes out of a power save mode for any reason (e.g., to receive data or transmit a packet) and the second one of the client sessions is in a power save mode, the WLAN device will not save power for the second client session, even though this second client session remains in the power save mode. That is, power savings are not realized because both client sessions share the same channel, and this channel must be enabled for the first client session. As a result, the WLAN device undesirable consumes power each time that the first client session wakes up in response to beacons transmitted from the wireless AP (even though the second session is in a power save mode at this time), and each time the second client session wakes up in response to beacons transmitted from the P2P-GO (even though the first session is in a power save mode at this time).

It would therefore be desirable to have methods and apparatuses for reducing power consumption in a WLAN device operating with single channel concurrency.

SUMMARY

Accordingly, the present disclosure provides at least a method and structure that effectively utilizes the wake up time of a WLAN device implementing single channel concurrency, thereby reducing the number of times that the WLAN device must be woken up from a power save mode, and reducing power consumption.

In one embodiment, a wireless device implements a first wireless client and a second wireless client that communicate on a shared wireless channel (single channel concurrency). A power saving controller monitors the first and second wireless clients to determine whether these wireless clients are in an active mode or a power save mode. If both wireless clients are in power save mode, and one of these wireless clients transitions to the active mode, then the power saving controller causes the other one of these wireless clients to transition to an active mode as well. The wireless client 'awakened' by the power saving controller indicates its active mode to its associated wireless AP (or P2P-GO). In a particular embodiment, the 'awakened' wireless client indicates its active mode by transmitting a NULL frame (in accordance with the IEEE 802.11 standard) having a power management bit set to a logic '0' value. Upon receiving this NULL frame, the associated wireless AP (or P2P-GO) becomes aware that the 'awakened' wireless client is in the active mode. At this time, the first wireless client is enabled to receive any buffered data stored by its associated wireless AP (or P2P-GO), and the second wireless client is also enabled to receive any buffered data stored by its associated wireless AP (or P2P-GO).

After the first wireless client receives all its buffered data (if any) from its associated wireless AP (or P2P-GO), the first wireless client returns to power save mode. In accordance with one embodiment, upon detecting that the first wireless client returns to power save mode, the power saving controller instructs the first wireless client to transmit a NULL frame having a power management bit set to a logic '1' value to its associated wireless AP (or P2P-GO), effectively informing this associated wireless AP (or P2P-GO) that the first wireless client has returned to the power save mode.

Similarly, after the second wireless client receives all its buffered data (if any) from its associated wireless AP (or P2P-GO), the second wireless client returns to power save mode. In accordance with one embodiment, upon detecting that the second wireless client returns to power save mode, the power saving controller instructs the second wireless client to transmit a NULL frame having a power management bit set to a logic '1' value to its associated wireless AP (or P2P-GO), effectively informing this associated wireless AP (or P2P-GO) that the second wireless client has returned to the power save mode.

If the wireless client that was awakened by the power saving controller does not have any new data buffered by its associated wireless AP (or P2P-GO) by the time this wireless client receives its next beacon, then this wireless client will not need to transition from the power save mode to the active mode in response to this next beacon (because the awakened wireless client previously received all of its associated buffered data after being awakened). If the awakened wireless client is able to remain in power save mode in response to its next received beacon, then both the first and second wireless clients are allowed to remain in the power save mode for an extended period, advantageously reducing power consumption of the wireless device.

The present invention will be more fully understood in view of the following description and drawings.

DETAILED DESCRIPTION

Figure 1:
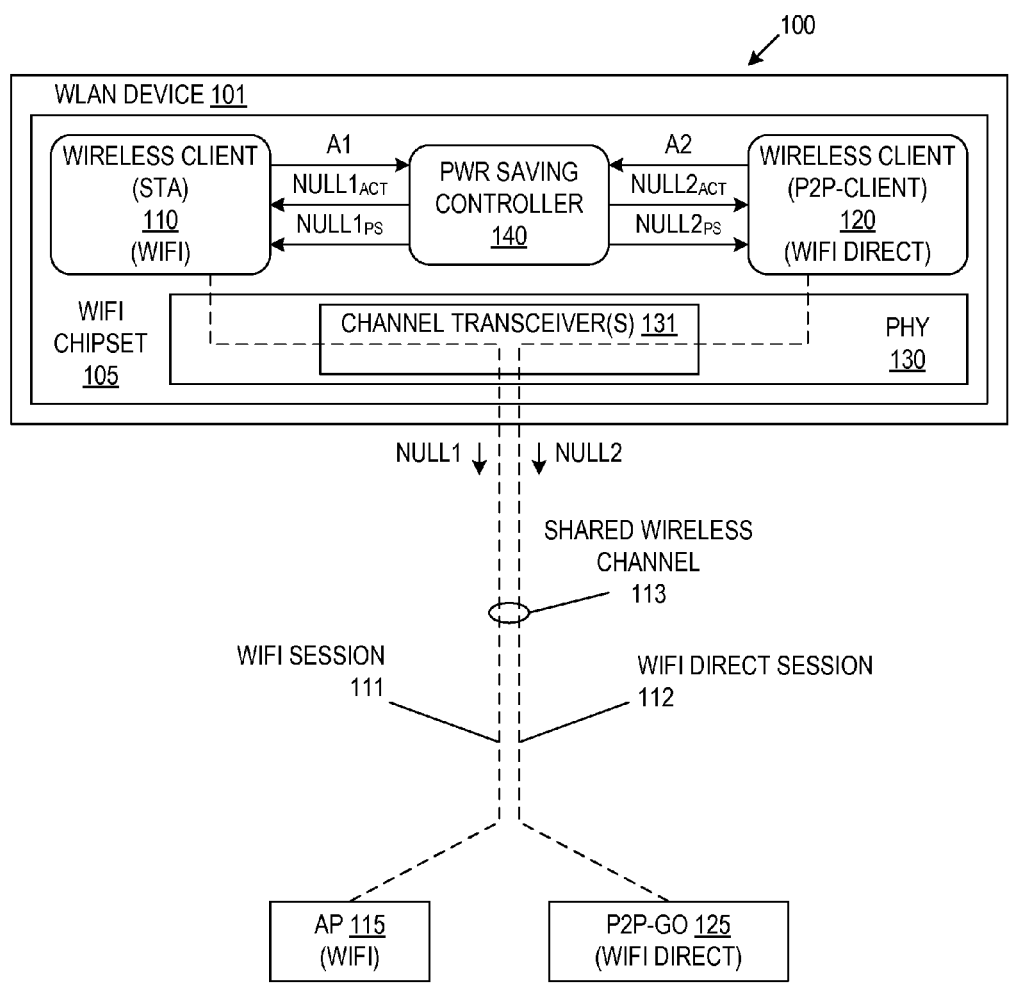
FIG. 1 is a block diagram of a wireless system including a WLAN device that achieves power savings while operating with single channel concurrency, in accordance with one embodiment.

FIG. 1 is a block diagram that illustrates a wireless communication system 100 that includes WLAN device 101, wireless AP 115 and P2P-GO 125 in accordance with one embodiment. WLAN device 101 includes a Wi-Fi chipset 105 that implements a first wireless client (STA) 110, a second wireless client (P2P-client) 120 and power saving controller 140. Although only two wireless clients 110 and 120 are illustrated in FIG. 1, it is understood that Wi-Fi chipset 105 may implement more than two wireless clients (or other types of wireless clients) in other embodiments. Wi-Fi chipset 105 also implements a physical layer (PHY) 130, which includes one or more channel transceivers 131 that enable wireless clients 110 and 120 to communicate with wireless AP 115 and P2P-GO 125, respectively, on a shared wireless channel 113. Note that the shared wireless channel 113 supports a Wi-Fi session 111 between wireless client (STA) 110 and AP 115, as well as a concurrent Wi-Fi Direct (P2P) session 112 between wireless client (P2P-client) 120 and P2P-GO 125. In one embodiment, these wireless sessions 111 and 112 are each implemented in accordance with the IEEE 802.11 standard. In other embodiments, these wireless sessions 111-112 can be implemented in accordance with other standards.

Power saving controller 140 (which can be implemented by software and/or firmware in various embodiments) controls the operation of wireless clients 110 and 120 to achieve power savings in the manner described below. In general, if both wireless clients 110 and 120 are in power save mode, and one of these wireless clients transitions to the active mode, then power saving controller 140 causes the other one of these wireless clients to transition to the active mode (power saving controller 140 wakes up the sleeping wireless client such that both of the wireless clients are in an active mode at the same time). The wireless client awakened by power saving controller 140 indicates its active state to its associated device (e.g., wireless client 110 indicates its active state to wireless AP 115, or wireless client 120 indicates its active state to P2P-GO 125). At this time, wireless client 110 may receive any buffered data stored by wireless AP 115 (over shared channel 113, through enabled transceiver(s) 131), and wireless client 120 may receive any buffered data stored by P2P-GO 125 (over shared channel 113, through enabled transceiver(s) 131). In one embodiment, data for the two sessions 111 and 112 may be interleaved on shared wireless channel 113. After wireless clients 110 and 120 receive the buffered data (if any) from wireless AP 115 and P2P-GO 125, both wireless clients 110 and 120 return to the power save mode and the process is repeated.

Ideally, the wireless client that is awakened (activated) by power saving controller 140 will not need to transition from the power save mode to the active mode in response to a beacon received at its next scheduled TBTT. For example, the awakened wireless client will not need to transition to the active mode as long as the associated wireless AP (or P2P-GO) does not buffer any new data for the awakened wireless client between the time that the awakened wireless client received its buffered data and its next scheduled TBTT. If the awakened wireless client is able to remain in power save mode in response to its next received beacon, then both wireless clients 110 and 120 are allowed to remain in the power save mode for an extended period, advantageously reducing power consumption of WLAN device 101.

The operation of wireless communication system 100, and in particular, power saving controller 140, is described in more detail below.

Wireless client 110 provides a state value A1 to power saving controller 140, thereby informing power saving controller 140 whether wireless client 110 is in an active mode (A1=1) or a power saving mode (A1=0). Similarly, wireless client 120 provides a state value A2 to power saving controller 140, thereby informing power saving controller 140 whether wireless client 120 is in an active mode (A2=1) or a power saving mode (A2=0).

As described in more detail below, power saving logic 140 provides control signals $NULL1_{ACT}$ and $NULL1_{PS}$ to wireless client 110 and control signals $NULL2_{ACT}$ and $NULL2_{PS}$ to wireless client 120 in response to the received state values A1 and A2. Wireless client 110 may transmit NULL frames (e.g., in accordance with a IEEE 802.11 standard) to the associated wireless AP 115 on the shared channel 113 in response to the received control signals $NULL1_{ACT}$ and $NULL1_{PS}$. Similarly, wireless client 120 may transmit NULL frames (e.g., in accordance with an IEEE 802.11 standard) to the associated P2P-GO 125 on the shared channel 113 in response to the received control signals $NULL2_{ACT}$ and $NULL2_{PS}$.

In one embodiment, the NULL frame includes a power management bit that is set to a logic 0 value to indicate that the wireless client transmitting the NULL frame is an active mode (awake) or a logic 1 value to indicate that the wireless client transmitting the NULL frame is in a power save mode (asleep). A wireless AP (or P2P-GO) receiving a NULL frame having a power management bit set to a logic 1 value from a wireless client is thereby informed that the wireless client is in a power save mode, effectively instructing the wireless AP (or P2P-GO) to buffer data intended for the wireless client. When the wireless AP (or P2P-GO) subsequently receives a NULL frame having a power management bit set to a logic 0 value from the same wireless client, the wireless AP (or P2P-GO) is thereby informed that the wireless client is in an active mode, effectively instructing the wireless AP (or P2P-GO) to transmit the buffered data to the wireless client.

Wireless client 110 may transmit a NULL frame having a power management bit set to a logic 0 value to wireless AP 115 in response to receiving an activated NULL1$_{ACT}$ control signal (e.g., NULL1$_{ACT}$=1) from power saving controller 140. Wireless client 110 may transmit a NULL frame having a power management bit set to a logic 1 value to wireless AP 115 in response to receiving an activated NULL1$_{PS}$ control signal (e.g., NULL1$_{PS}$=1) from power saving controller 140. NULL frames transmitted from wireless client 110 are generically labeled NULL1 in FIG. 1.

Similarly, wireless client 120 may transmit a NULL frame having a power management bit set to a logic 0 value to P2P-GO 125 in response to receiving an activated NULL2$_{ACT}$ control signal (e.g., NULL2$_{ACT}$=1) from power saving controller 140. Wireless client 120 will transmit a NULL frame having a power management bit set to a logic 1 value to P2P-GO 125 in response to receiving an activated NULL2$_{PS}$ control signal (e.g., NULL2$_{PS}$=1) from power saving controller 140. NULL frames transmitted from wireless client 120 are generically labeled NULL2 in FIG. 1.

Figure 3:
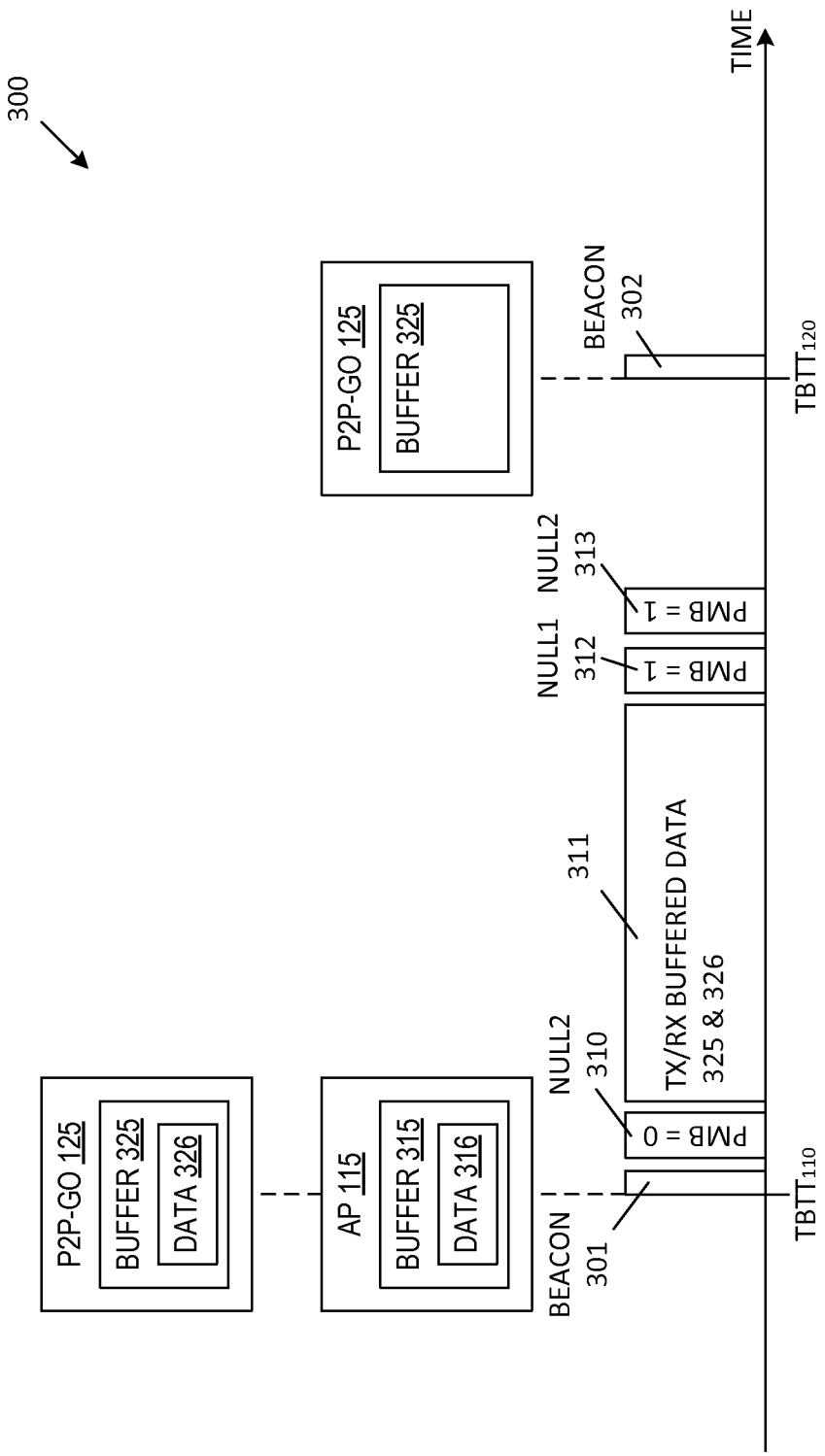
FIG. 3 is a timing diagram that illustrates operating conditions of the wireless communication system of FIG. 1 in accordance with one embodiment.

FIG. 3 is a timing diagram 300 illustrating operating conditions of wireless communication system 100 in accordance with one embodiment (FIG. 3 illustrates the status of wireless AP 115 and P2P-GO 125 at time TBTT$_{110}$). AP 115 periodically transmits beacons to wireless client 110 at a first set of TBTTs, and P2P-GO 125 periodically transmits beacons to wireless client 120 at a second set of TBTTs, different than the first set of TBTTs. For example, as illustrated in FIG. 3, AP 115 transmits beacon 301 to wireless client 110 at TBTT$_{110}$, and P2P-GO 125 subsequently transmits beacon 302 to wireless client 120 at TBTT$_{120}$.

Wireless AP 115 includes a buffer 315 that stores data 316 intended for wireless client 110. Similarly, P2P-GO 125 includes a buffer 325 that stores data 326 intended for wireless client 120. Immediately prior to TBTT$_{110}$, both wireless clients 110 and 120 are in power save mode (e.g., A1=A2=0). Wireless client 110 detects beacon 301 at TBTT$_{110}$, and in response, determines that wireless AP 115 stores buffered data 316 intended for wireless client 110. As a result, wireless client 110 transitions from the power save mode to the active mode to receive the buffered data 316. At this time, wireless client 110 causes the control signal A1 to transition from a logic '0' state to a logic '1' state to indicate the transition from the power save mode to the active mode.

Figure 2:
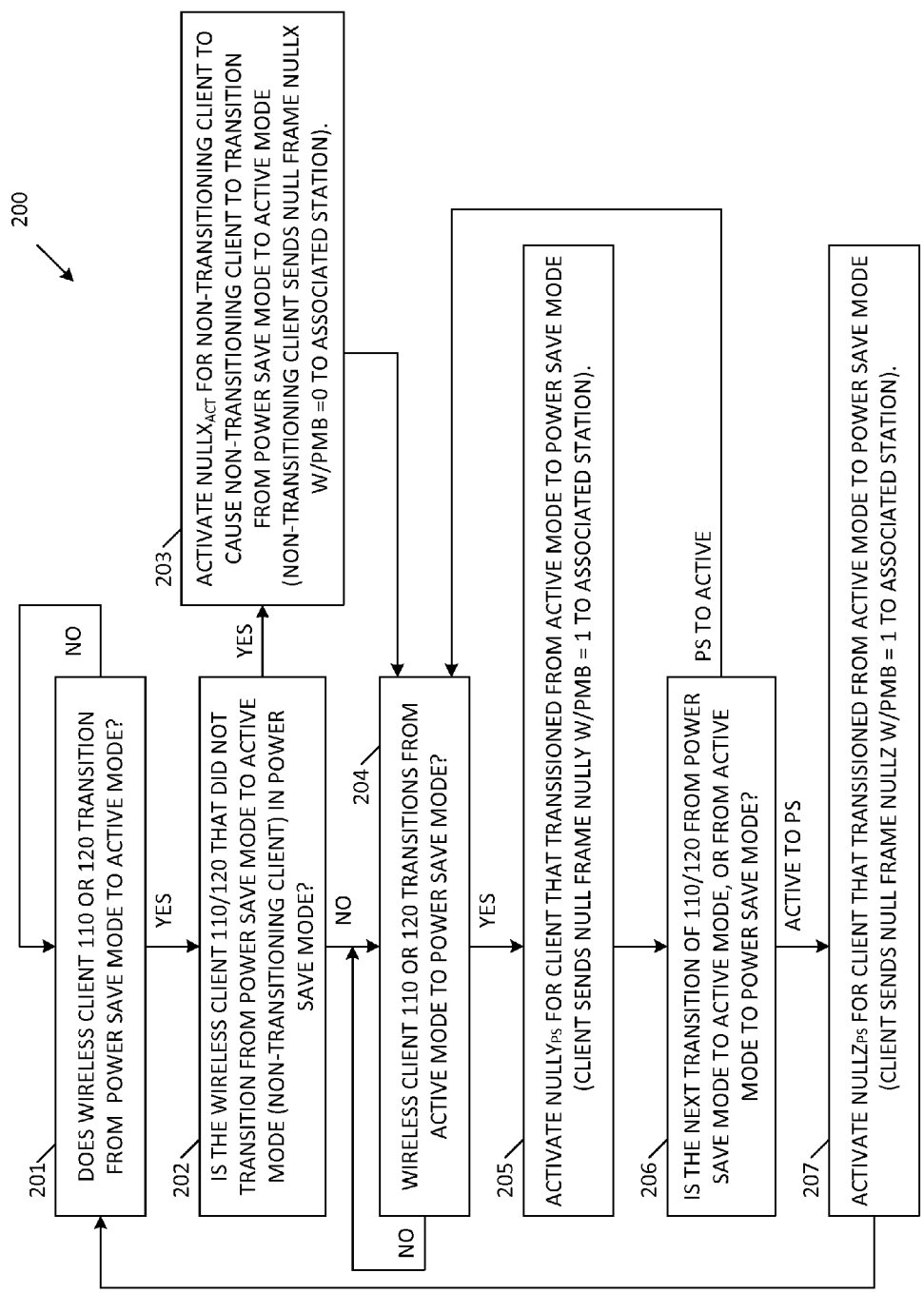
FIG. 2 is a flow diagram illustrating the operation of a power saving controller of the WLAN device of FIG. 1 in accordance with one embodiment.

FIG. 2 is a flow diagram 200 illustrating the operation of power saving controller 140 in accordance with one embodiment. Referring to FIG. 2, power saving controller 140 monitors the control signals A1 and A2 to determine whether wireless client 110 or wireless client 120 transitions from the power save mode to the active mode (201). If neither of the wireless clients 110/120 transitions from the power save mode to the active mode (e.g., both wireless clients are in the power save mode as they are prior to TBTT$_{110}$ in FIG. 3), then processing loops back to 201 (No branch).

If power saving controller 140 detects that wireless client 110 or wireless client 120 transitions from the power save mode to the active mode (201, Yes branch), then power saving controller determines whether the other (non-transitioning) wireless client is in the power save mode (202). In the example of FIG. 3, power saving controller 140 determines that wireless client 110 transitions from the power save mode to the active mode at TBTT$_{110}$ (201, Yes branch), and power saving controller 140 then determines whether the other wireless client 120 (e.g., the non-transitioning wireless client) is in the power save mode (202).

If the non-transitioning wireless client is not in the power save mode (e.g., is in the active mode) (202, No branch), then both wireless clients 110 and 120 are in the active mode, and processing proceeds to Step 204.

If the non-transitioning wireless client is in the power save mode, then power saving controller activates the NULLX$_{ACT}$ control signal, wherein 'X' identifies the non-transitioning wireless client (e.g., X=1 if wireless client 110 is the non-transitioning wireless client and X=2 if wireless client 120 is the non-transitioning wireless client). In the example of FIG. 3, power saving controller 140 determines that non-transitioning wireless client 120 is in the power save mode (202, Yes branch), and in response, activates the NULL2$_{ACT}$ control signal (NULL2$_{ACT}$=1), which is provided to wireless client 120 (203).

In response to receiving the activated NULLX$_{ACT}$ control signal, the non-transitioning wireless client transitions from the power save mode to the active mode, and transmits a null frame NULLX to its associated device (e.g., wireless AP 115 or P2P-GO 125), wherein the null frame NULLX includes a power management bit (PMB) having a value of 0, thereby informing the associated device that the non-transitioning wireless client is in an active mode. In the example of FIG. 3, wireless client 120 transitions from the power save mode to the active mode in response to receiving the activated NULL2$_{ACT}$ control signal. Note that wireless client 120 causes the control signal A2 to transition from a logic 0 value to a logic 1 value to indicate the active mode of the wireless controller 110. Wireless client 120 also transmits a null frame NULL2 310 to P2P-GO 125, wherein the null frame NULL2 310 includes a power management bit having a value of 0, thereby indicating to P2P-GO 125 that the wireless client 120 is in active mode, and is therefore able to receive buffered data 326.

As illustrated by FIG. 3, wireless AP 115 transmits buffered data 316 to wireless client 110, and P2P-GO 125 transmits buffered data 326 to wireless client 120 over common channel 113 during period 311. After wireless client 110 receives all of the buffered data 316, wireless client 110 transitions from active mode to power save mode (A1 transitions from 1 to 0). Similarly, after wireless client 120 receives all of the buffered data 326, wireless client 120 transitions from active mode to power save mode (A2 transitions from 1 to 0).

Returning to FIG. 2, processing proceeds from 203 to 204. Regardless of whether 204 is reached from 202 or 203, both wireless clients 110 and 120 are in active mode when entering 204. In 204, power saving controller 140 determines whether either of wireless client 110 or wireless client 120 transitions from the active mode to the power save mode (by monitoring control signals A1 and A2). If power saving controller 140 does not detect such a transition (204, No branch), processing remains in 204.

When power saving controller 140 detects that at least one of the wireless clients 110 or 120 has transitioned from the active mode to the power save mode (204, Yes branch), power saving controller 140 activates the NULLY$_{PS}$ control signal, wherein Y identifies the wireless client that transitioned from the active mode to the power save mode (e.g., Y=1 if wireless client 110 transitioned from active mode to power save mode, and Y=2 if wireless client 120 transitioned from active mode to power save mode) (205). In the example of FIG. 3, power saving controller 140 determines that wireless client 110 transitions from the active mode to the power save mode (204, Yes branch), and in response, activates the NULL1$_{PS}$ control signal (NULL1$_{PS}$=1), which is provided to wireless client 110 (205).

In response to receiving the activated NULLY$_{PS}$ control signal, the corresponding wireless client transmits a null frame NULLY to its associated device (e.g., wireless AP 115 or P2P-GO 125), wherein the null frame NULLY includes a power management bit (PMB) having a value of 1, thereby informing the associated device that the wireless client is in power save mode. In the example of FIG. 3, wireless client 110 transmits a null frame NULL1 312 to wireless AP 115, wherein the null frame NULL1 312 includes a power management bit having a value of '1', thereby indicating to wireless AP 115 that the wireless client 110 is in power save mode, and that new data intended for wireless client 110 should be buffered within wireless AP 115.

Processing then proceeds to 206, wherein power saving controller 140 monitors the control signals A1 and A2 to determine whether the next transition exhibited by wireless clients 110 and 120 is from the power save mode to the active mode or from the active mode to the power save mode. Note that upon entering 206, one of the wireless clients 110/120 is necessarily in the power save mode and the other one of the wireless clients 110/120 is necessarily in the active mode. Thus, if the next detected transition is from the power save mode to the active mode (206, 'PS to Active' branch), then both of the wireless clients 110 and 120 will be in the active mode. In this case, processing returns to 204.

However, if the next detected transition is from the active mode to the power save mode (206, 'Active to PS' branch), then both of the wireless clients will be in the power save mode. In this case, processing proceeds to 207, wherein power saving controller 140 activates the $NULLZ_{PS}$ control signal, wherein 'Z' identifies the wireless client that transitioned from the active mode to the power save mode in Step 206 (e.g., Z=1 if wireless client 110 transitioned from active mode to power save mode, and Z=2 if wireless client 120 transitioned from active mode to power save mode). In the example of FIG. 3, power saving controller 140 determines that wireless client 120 transitions from the active mode to the power save mode (206, 'Active to PS' branch), and in response, activates the $NULL2_{PS}$ control signal ($NULL2_{PS}$=1), which is provided to wireless client 120 (207).

In response to receiving the activated $NULLZ_{PS}$ control signal, the corresponding wireless client transmits a null frame NULLZ to its associated device (e.g., wireless AP 115 or P2P-GO 125), wherein the null frame NULLZ includes a power management bit (PMB) having a value of 1, thereby informing the associated device that the wireless client is in power save mode. In the example of FIG. 3, wireless client 120 transmits a null frame NULL2 313 to P2P-GO 125, wherein the null frame NULL2 313 includes a power management bit having a value of 1, thereby indicating to P2P-GO 125 that the wireless client 120 is in power save mode, and that new data intended for wireless client 120 should be buffered within P2P-GO 125.

Referring back to FIG. 2, after 207 is complete, both wireless clients 110 and 120 are necessarily in the power save mode, and processing returns to 201, wherein the above-described process can be repeated.

As illustrated by FIG. 3, immediately prior to $TBTT_{120}$, both wireless clients 110 and 120 are in the power save mode (e.g., A1=A2=0). Wireless client 120 detects beacon 302 at $TBTT_{120}$, and in response, determines that P2P-GO 125 does not currently store any buffered data for wireless client 120. That is, buffer 325 within P2P-GO does not currently store any data for wireless client 120, e.g., because buffer 325 was previously emptied when transmitting buffered data 326 to wireless client 120 during period 311, and buffer 325 did not subsequently receive any additional data for wireless client 120. As a result, wireless client 120 may not need to transition from the power save mode to the active mode at $TBTT_{120}$. Consequently, both wireless client 110 and wireless client 120 remain in the power save mode at $TBTT_{120}$, thereby resulting in power savings within WLAN device 101 (because the transceiver(s) 131 within PHY 130 only need to be powered in response to beacon 301, and not in response to both of the beacons 301 and 302).

Note that without power saving controller 140 and the signaling protocol of some embodiments, P2P-GO 125 would not be informed when the shared channel 113 is actively being used by Wi-Fi session 111. As a result, P2P-GO 125 would not be able to transmit buffered data to wireless client 120 at this time. Similarly, wireless AP 115 would not be informed when the shared channel 113 is actively being used by Wi-Fi Direct session 112. As a result, wireless AP 115 would not be able to transmit buffered data to wireless client 110.

In the manner described above, the present disclosure describes embodiments for power savings during low traffic conditions, because the wireless chipset 105 will be powered up (in active mode) less often than a conventional WLAN device operating with single channel concurrency. Some embodiments described also advantageously increase data throughput during high traffic conditions, because data can be transmitted to both wireless clients 110 and 120 when only one of these wireless clients initially transitions from a power saving mode to an active mode.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

We claim:

1. A method for saving power in a wireless device, comprising:
    determining that a first wireless client of the wireless device operating on a wireless channel has transitioned from a first power saving mode to a first active mode; and
    transitioning a second wireless client of the wireless device operating on the wireless channel from a second power saving mode to a second active mode in response to determining that the first wireless client has transitioned from the first power saving mode to the first active mode, wherein the first wireless client is in the first active mode and the second wireless client is in the second active mode concurrently.

2. The method of claim 1, further comprising:
    receiving by the first wireless client a first set of data using a first session established on the wireless channel in the first active mode; and
    receiving by the second wireless client a second set of data using a second session established on the wireless channel in the second active mode, wherein at least a portion of the first set of data and at least a portion of the second set of data are received concurrently.

3. The method of claim 2, further comprising at least one of the group consisting of:
    transitioning the first wireless client from the first active mode to the first power saving mode after receiving the first set of data, and
    transitioning the second wireless client from the second active mode to the second power saving mode after receiving the second set of data.

4. The method of claim 3, wherein transitioning the first wireless client from the first active mode to the first power saving mode comprises transmitting a first control frame from the first wireless client using the first session established on the wireless channel.

5. The method of claim 4, wherein the first control frame comprises a NULL frame in accordance with an IEEE 802.11 standard.

6. The method of claim 3, wherein transitioning the second wireless client from the second active mode to the second power saving mode comprises transmitting a second control frame from the second wireless client using the second session established on the wireless channel.

7. The method of claim 6, wherein the second control frame comprises a NULL frame in accordance with an IEEE 802.11 standard.

8. The method of claim 1, further comprising configuring the first wireless client to operate as a wireless station (STA).

9. The method of claim 8, further comprising configuring the second wireless client to operate as a peer-to-peer (P2P) client.

10. The method of claim 1, wherein transitioning the first wireless client comprises:
    receiving a beacon that indicates a first buffered information to be provided to first wireless client is available; and
    transitioning the first wireless client from the first power saving mode to the first active mode in response to the received beacon.

11. The method of claim 1, wherein transitioning the second wireless client comprises transmitting on the wireless channel a control frame from the second wireless client.

12. The method of claim 11, wherein the control frame comprises a NULL frame in accordance with an IEEE 802.11 standard.

13. The method of claim 12, wherein transitioning the second wireless client further comprises setting a power management bit in the NULL frame to a value that indicates that the second wireless client is not in the second power saving mode.

14. The method of claim 1, further comprising
    transitioning the second wireless client from a third power saving mode to a third active mode; and
    transitioning the first wireless client from a fourth power saving mode to a fourth active mode in response to determining that the second wireless client has transitioned from the third power saving mode to the third active mode, wherein the second wireless client is in the third active mode and the first wireless client is in the fourth active mode concurrently.

15. A wireless device comprising:
a first wireless client of the wireless device;
a second wireless client of the wireless device;
a transceiver coupled to the first and second wireless clients of the wireless device, the transceiver to enable the first and second wireless clients to concurrently communicate on a single wireless channel; and
a power saving controller coupled to the first and second wireless clients, the power saving controller to:
wake up the second wireless client when the first wireless client transitions from a power save mode to an active mode, and
wake up the first wireless client when the second wireless client transitions from the power save mode to the active mode.

16. The wireless device of claim 15, wherein the power saving controller is coupled to receive a first control signal from the first wireless client indicating whether the first wireless client is in the power save mode or the active mode, and is further coupled to receive a second control signal from the second wireless client indicating whether the second wireless client is in the power save mode or the active mode.

17. The wireless device of claim 15, wherein the power saving controller is coupled to provide a first set of instructions to the first wireless client, and a second set of instructions to the second wireless client, wherein the first set of instructions cause the first wireless client to transmit control frames on the wireless channel, and the second set of instructions cause the second wireless client to transmit control frames on the wireless channel.

18. The wireless device of claim 17, wherein the control frames are NULL frames in accordance with an IEEE 802.11 standard.

19. A non-transitory computer readable medium having instructions to cause a wireless device to execute a method comprising:
determining that a first wireless client of the wireless device operating on a wireless channel has transitioned from a first power saving mode to a first active mode; and
transitioning a second wireless client of the wireless device operating on the wireless channel from a second power saving mode to a second active mode in response to determining that the first wireless client has transitioned from the first power saving mode to the first active mode, wherein the first wireless client is in the first active mode and the second wireless client is in the second active mode concurrently.

20. The non-transitory computer readable medium of claim 19, the method further comprising:
receiving by the first wireless client a first set of data using a first session established on the wireless channel in the first active mode; and
receiving by the second wireless client a second set of data using a second session established on the wireless channel in the second active mode, wherein at least a portion of the first set of data and at least a portion of the second set of data are received concurrently.

21. The non-transitory computer readable medium of claim 20, the method further comprising at least one of the group consisting of:
transitioning the first wireless client from the first active mode to the first power saving mode after receiving the first set of data, and
transitioning the second wireless client from the second active mode to the second power saving mode after receiving the second set of data.

22. The non-transitory computer readable medium of claim 21, wherein transitioning the first wireless client from the first active mode to the first power saving mode comprises transmitting a first control frame from the first wireless client using the first session established on the wireless channel.

23. The non-transitory computer readable medium of claim 22, wherein the first control frame comprises a NULL frame in accordance with an IEEE 802.11 standard.

24. The non-transitory computer readable medium of claim 21, wherein transitioning the second wireless client from the second active mode to the second power saving mode comprises transmitting a second control frame from the second wireless client using the second session established on the wireless channel.

25. The non-transitory computer readable medium of claim 24, wherein the second control frame comprises a NULL frame in accordance with an IEEE 802.11 standard.

26. The non-transitory computer readable medium of claim 19, the method further comprising configuring the first wireless client to operate as a wireless station (STA).

27. The non-transitory computer readable medium of claim 26, the method further comprising configuring the second wireless client to operate as a peer-to-peer (P2P) client.

28. The non-transitory computer readable medium of claim 19, wherein transitioning the first wireless client comprises:
receiving a beacon that indicates a first buffered information to be provided to first wireless client is available; and
transitioning the first wireless client from the first power saving mode to the first active mode in response to the received beacon.

29. The non-transitory computer readable medium of claim 28, wherein the control frame comprises a NULL frame in accordance with an IEEE 802.11 standard.

30. The non-transitory computer readable medium of claim 29, wherein transitioning the second wireless client further comprises setting a power management bit in the NULL frame to a value that indicates that the second wireless client is not in the second power saving mode.

31. The non-transitory computer readable medium of claim 19, wherein transitioning the second wireless client comprises transmitting on the wireless channel a control frame from the second wireless client.

32. The non-transitory computer readable medium of claim 19, the method further comprising:
transitioning the second wireless client from a third power saving mode to a third active mode; and
transitioning the first wireless client from a fourth power saving mode to a fourth active mode in response to determining that the second wireless client has transitioned from the third power saving mode to the third active mode, wherein the second wireless client is in the third active mode and the first wireless client is in the fourth active mode concurrently.

* * * * *